United States Patent [19]
Proscia

[11] Patent Number: 5,248,545
[45] Date of Patent: * Sep. 28, 1993

[54] ANTI-IRIDESCENT COATINGS WITH GRADIENT REFRACTIVE INDEX

[75] Inventor: James W. Proscia, Dearborn, Mich.

[73] Assignee: Ford Motor Company, Dearborn, Mich.

[*] Notice: The portion of the term of this patent subsequent to Dec. 1, 2009 has been disclaimed.

[21] Appl. No.: 720,145

[22] Filed: Jun. 24, 1991

[51] Int. Cl.⁵ ............................................. B32B 7/02
[52] U.S. Cl. ..................... 428/212; 427/166; 427/167; 427/255; 427/255.3; 428/34; 428/213; 428/216; 428/336; 428/428; 428/432; 428/697; 428/699; 428/701; 428/702
[58] Field of Search ................. 428/34, 212, 213, 216, 428/428, 432, 336, 697, 699, 701, 702; 427/108, 109, 126.3, 166, 167, 255, 255.3

[56] References Cited

U.S. PATENT DOCUMENTS

| | | | |
|---|---|---|---|
| 2,758,510 | 8/1956 | Auwarter | 359/581 |
| 2,932,592 | 4/1960 | Cameron | 359/589 |
| 3,176,574 | 4/1965 | Socha | 359/586 |
| 3,378,396 | 4/1968 | Zaromb | 428/428 |
| 3,990,784 | 11/1976 | Gelber | 359/589 |
| 4,187,336 | 2/1980 | Gordon | 428/34 |
| 4,308,316 | 12/1981 | Gordon | 428/336 |
| 4,310,584 | 1/1982 | Cooper et al. | 428/212 |
| 4,377,613 | 3/1983 | Gordon | 428/212 |
| 4,419,386 | 12/1983 | Gordon | 427/109 |
| 4,440,822 | 4/1984 | Gordon | 428/216 |
| 4,556,599 | 12/1985 | Sato et al. | 428/216 |
| 4,581,280 | 4/1986 | Taguchi et al. | 428/212 |
| 4,971,843 | 11/1990 | Michelotti | 428/34 |

FOREIGN PATENT DOCUMENTS 0348185 12/1989 European Pat. Off. .

OTHER PUBLICATIONS

Hamburg et al, "Evaporated Sn-doped In₂O₃ films: Basic Optical properties and applications to energy-efficient windows", *J. Appl. Phys.* 60(11), Dec. 1, 1986.
Berning, "Principles of design of architectural coatings", *Applied Optics*, vol. 22, p. 4127, Dec. 15, 1983.
MacLeod, "Thin-Film Optical Filters", Adam Hilger Ltd., London, 1969, pp. 37–43.
Vasicek, A., *Optics of Thin Films*, North-Holland Publishing Company, Amsterdam, 1960.

*Primary Examiner*—Paul J. Thibodeau
*Assistant Examiner*—Hoa T. Le
*Attorney, Agent, or Firm*—Lorraine S. Melotik; Roger L. May

[57] ABSTRACT

A substantially transparent glazing article has an optically functional coating on a transparent substrate. The coating has an optically functional topcoat layer and an anti-iridescence layer between the topcoat and the substrate. The refractive index anti-iridescence layer is (i) higher than the refractive index of the substrate in a first high refractive index zone directly on the substrate surface, (ii) lower than that of the first high refractive index zone in a low refractive index zone directly on the first high refractive index zone, and (iii) higher than that of the low refractive index zone in a second high refractive index zone directly on the low refractive index zone. The refractive index of the anti-iridescence layer varies in at least one of the zones substantially continuously with distance from the substrate surface. Contiguous zones may together form a single gradient index zone. The anti-iridescence layer is less thick than the optically functional layer and substantially reduces or eliminates iridescence without significantly impairing the optical functionality of the top coat layer.

15 Claims, 1 Drawing Sheet

5,248,545

ANTI-IRIDESCENT COATINGS WITH GRADIENT REFRACTIVE INDEX

INTRODUCTION

This application is directed to anti-iridescent coatings particularly suitable for use on glass and other transparent substrates, such as in glazing applications and the like. In particular, the invention provides a multi-zone anti-iridescent layer on a substrate surface beneath an optically functional layer. The invention further provides methods for producing such structures.

BACKGROUND OF THE INVENTION

It is well known that glass and like transparent substrates can be coated with transparent films to provide or alter optical properties, such as transmission, reflection, electrical conductivity, etc. Particularly significant commercial uses for such coatings include, for example, infrared reflection, low-emissivity and solar load reduction, etc. In solar load control applications, for example, such coatings reduce the amount of solar energy in the non-visible wavelengths passing through the glazing panel to reduce an air-conditioning load within a building, motor vehicle, etc. In a low emissivity glazing application, such coatings reduce the heating load of a building in a cold climate by reducing the loss of infrared radiation from the heated interior of the building through the glazing panel. Typically, for example, glass and other transparent materials can be coated with transparent semi-conductor films such as tin oxide, indium oxide or cadmium stannate, in order to reflect infrared radiation. Coatings of these same materials and other materials also conduct electricity, and are employed as resistance heaters to heat windows, particularly in motor vehicles, airplanes, etc. to remove fog and ice.

It is a recognized problem that substrates bearing such coatings may show iridescence, that is, color in reflected light and, to a lesser extent, in transmitted light. Such iridescence is understood to be generally the result of an interference phenomenon wherein certain wavelengths reflected partially at the exterior of the coating are out of phase with light of that wavelength reflected from the interface of the coating with the substrate, while reflected light of other wavelengths is in phase and interferes additively. The degree to which the reflected light of a given wavelength cancels or interferes additively is a function of the wavelength and the optical thickness of the coating.

The iridescence effect typically associated with coatings less than about 1 micron, especially less than about 0.75 microns, is aesthetically unacceptable in many architectural, motor vehicle and other applications. In fact, interference colors most generally occur with coatings in the thickness range of 0.1 to 1.0 micron, a thickness range of significant practical importance in many commercial applications. A large portion of present commercial production of coated glass glazing panels, for example, comprise coatings in the thickness range of about 0.1 to 1.0 micron, which display pronounced iridescent colors, especially in reflected daylight. The presence of iridescence is commonly understood to inhibit the use of more energy efficient coated glass in many glazing applications, despite the fact that the potential energy conservation would make the application cost effective. In addition, lack of thickness uniformity in the coating results in the appearance of multiple colors on a single piece of glass, sometimes referred to as banding, often rendering the glazing unit visually unacceptable.

One known means of reducing visible interference colors from such film coatings on glass or a like substrate is to increase the thickness of the coating to greater than one micron. Thicker coatings, however, are more expensive to make, requiring more reactant and longer deposition times. Furthermore, they have a greater tendency to crack as a result of thermal stress. An alternative means of reducing interference color involves the use of an underlayer coating between the substrate surface and the optically functional coating. For example, a known color suppressing undercoat for a fluorine-doped tin oxide low emissivity coating 3,000 to 4,000 Angstroms thick consists essentially of a Si-O-C interlayer between the glass substrate and the overcoat. The interlayer has a refractive index intermediate that of the substrate and the overcoat and is about 700 Angstroms thick.

In U.S. Pat. No. 4,440,822 to Gordon heat loss by infrared radiation through the glass areas of a heated building is said to be approximately one-half the heat loss through uncoated windows. The presence of iridescent colors on coated glass is said to be a major reason preventing its use. The Gordon '822 patent is directed to transparent glass window structures wherein the glass bears a coating of infrared reflective material with an interlayer of continuously varying refractive index between the glass and the coating. The refractive index of the interlayer is said to increase continuously from a low value at the interface of the interlayer with the substrate to a high value at the interface with the infrared reflective coating. FIG. 5 of that patent, for example, shows an underlayer consisting of tin oxide and silicon oxide wherein the relative proportion of tin and, hence, the refractive index, both increase with distance from the glass surface. The refractive index increases from about 1.5 at the glass surface to about 2.0 at the interface with the thick film coating of infrared reflective material. Reducing color to a low level of iridescence by interposing, between a substrate and a coating, a graded-index layer that varies in refractive index between the values at the two boundaries also is suggested in *Principles of Design of Architectural Coatings*, APPLIED OPTICS, Volume 22, No. 24, pp. 4127–4144 (15 Dec. 1983).

Other approaches have been suggested. In U.S. Pat. No. 4,308,316 to Gordon and in U.S. Pat. No. 4,187,336 to Gordon (a division of Gordon '316) single and double layer undercoats on glass under a thick film coating of tin oxide are taught for reducing iridescence. The one or more layers of transparent material between the glass and the semi-conductor coating are said to have refractive indices intermediate those of the glass and the semi-conductor. The double interlayer taught by these patents involves a first sub-layer closest to the glass having a lower refractive index and a second sub-layer closer to the semi-conductor coating having a relatively higher refractive index, both values being, as stated immediately above, intermediate the refractive index values of the glass and the coating.

In U.S. Pat. Nos. 4,419,386 to Gordon and 4,377,613 to Gordon (a division of Gordon '386) an intermediate layer is placed between a glass substrate and an infrared reflecting coating to reduce iridescence. The interlayer is similar to that disclosed in above mentioned U.S. Pat.

No. 4,187,336 to Gordon, except that the order of refractive index is reversed. That is, the sub-layer further from the glass has the lower refractive index while the sub-layer closer to the glass has the higher refractive index. It is claimed that by reversing the order the color suppression is achieved using thinner layers.

The importance of color properties for window coatings is recognized also in *Evaporated Sn-Doped In₂O₃ Films: Basic Optical Properties and Applications to Energy-Efficient Windows,* J.Appl.Phys. 60 (11) pp. 123–159. Section X.C of that article discusses anti-reflection treatment for significantly decreasing iridescence. It is noted that iridescence has plagued earlier oxide-type window coatings, leading manufacturers to use film thicknesses much larger than those required to obtain a desired low thermal emittance. This is noted to be inefficient in terms of materials utilization and process time. An anti-reflection coating of sputtered aluminum oxyfluoride material is mentioned.

Many such known anti-iridescence undercoats, including some of the undercoats of the Gordon patents, present a haze problem. Specifically, some of the Gordon patents admit that many of the disclosed coatings, when used on ordinary window glass, show considerable haze or scattered light. To remedy this deficiency, Gordon recommends first depositing on the glass substrate surface a layer of low refractive index material such as $SiO_2$. Also suggested for this purpose are $Si_3N_4$ and $GeO_2$. In particular, it is asserted that if the initial layer contains large proportions of materials including, for example, $SnO_2$, "then haze formation is likely."

Another difficulty connected with the anti-iridescence undercoats suggested in the Gordon patents and in other teachings is their sensitivity to the thickness of the interlayers. Specifically, the degree of anti-iridescence efficacy depends strongly on depositing the interlayers within precise thickness ranges and with highly uniform thickness. In U.S. Pat. No. 4,187,336, for example, it is suggested that a change of plus or minus 0.02 in the refractive index or a change of plus or minus 10% in the thickness of certain single layer undercoatings would be sufficient to raise the color saturation to observable values. In coated substrate production on an industrial scale, it may be difficult in certain instances to guarantee coating deposition within such narrow ranges. Certain double interlayer systems are suggested by Gordon to have broader permissible thickness variations. Coating systems with high tolerance of film thickness variations are commercially and economically desirable.

It is an object of the present invention to provide a substantially transparent glazing article having a coating with an anti-iridescence layer which is, at least in certain preferred embodiments of the invention, tolerant of deviations in its parameters, specifically, deviations in the thickness and refractive index of both the anti-iridescence interlayer and the optically functional coating (low emissivity coating, solar load control coating, etc.). In particular, it is an object of the invention to provide a substantially transparent glazing article and a method of producing the same which are robust in their industrial implementation. Specifically, it is an object of the invention to provide such glazing article wherein at least certain preferred embodiments have product and manufacturing process specifications with tolerance ranges readily achievable using presently available manufacturing techniques and equipment. These and other objects of the present invention will be better understood from the following disclosure and description thereof.

SUMMARY OF THE INVENTION

According to a first aspect of the present invention, a substantially transparent glazing article comprises a substrate having a substantially transparent coating on a surface thereof. The substrate is substantially transparent glass or plastic or the like. The coating comprises an optically functional layer and an anti-iridescence layer mediate the substrate and the optically functional layer. As discussed further below, the optically functional layer provides one or more functionalities such as, for example, low emissivity, solar load control, electrical conductivity, infrared reflectivity, ultraviolet reflectivity and the like. The anti-iridescence layer is thinner than the optically functional layer and substantially reduces or eliminates iridescence otherwise caused by the topcoat. Interference color can be controlled or eliminated by the anti-iridescence layer to render either a colorless coating or a coating having a substantially uniform, muted overall color. The latter condition is particularly advantageous for aesthetic reasons in certain preferred applications.

The anti-iridescence layer has a gradient refractive index which is higher than that of the substrate in a first zone directly on the substrate surface. The refractive index of the anti-iridescence layer is then lower in a low refractive index zone immediately following the high refractive index zone. The refractive index is again higher in a second high refractive index zone immediately following the low refractive index zone, such that the low refractive index zone is sandwiched between the two high refractive index zones. The refractive index of the anti-iridescence layer varies in at least one of the aforesaid zones substantially continuously with distance from the substrate surface. Thus, it should be understood that the refractive index of the first high refractive index zone is higher than that of the substrate in the sense that it is higher at least at the interface between them. Likewise, the refractive index of the first low refractive index zone is lower than that of the first high refractive index zone at least at their interface. The refractive index of the second high refractive index zone is higher than that of the first low refractive index zone at least at their interface.

Any of the individual zones of the anti-iridescence layer may have a substantially constant refractive index or may have a refractive index which is constant for a portion of its thickness and forms a gradient in the remainder of its thickness. In addition, any two or more contiguous zones may combine to form a gradient index zone. In embodiments wherein two or more zones of the anti-iridescent layer together form a gradient index zone, the refractive index therein changes substantially continuously with distance from the substrate. In such embodiments, there may be no sharp plane of demarcation between one zone and another within the gradient index zone. The first low refractive index zone and the second high refractive index zone may together form a gradient index zone, for example, wherein the refractive index first decreases from the value at the interface with the first high refractive index zone and then at some point, preferably about the midpoint, increases again. In an alternative embodiment of this type, the first low refractive index zone and the second high refractive index zone may together form a gradient index zone wherein the refractive index increases substantially continuously from a low value (i.e. lower than the refractive index of the first high refractive index zone) at the interface with the first high refractive index zone. Any portion of the thickness of such gradient index zone closer to the first high refractive index zone may be designated the first low refractive index zone. The next portion, further from the first high refractive index zone, is then the second high refractive index zone. The first low refractive index zone in such embodiment is seen to be sandwiched between zones of higher refractive index in accordance with a general principle of the invention. From the foregoing discussion, those skilled in the art will readily understand the manner in which other pairs or sets of contiguous thickness zones of the anti-iridescent layer can be combined in a single gradient index zone. Of course, multiple separate and distinct zones of continuously varying refractive index may be employed in anti-iridescent layers of the invention. The first high refractive index zone and the second high refractive index zone, for example, each may have a continuously varying refractive index and sandwich between them a low refractive index zone of substantially constant refractive index.

As discussed in greater detail below, one preferred embodiment of the invention employs an anti-iridescence layer wherein the refractive index is substantially constant in a first high refractive index zone directly on the surface of the substrate, followed by a gradient index zone in which the refractive index increases from a starting value lower than the refractive index of the high refractive index zone.

A second aspect of the invention is directed to a method of producing the substantially transparent glazing article disclosed immediately above. Specifically, such method comprises depositing the first high refractive index zone on the substantially transparent substrate, followed by the first low refractive index zone and then the second high refractive index zone, one or more of the zones, separately or together, forming a gradient index zone. The optically functional layer is then deposited over the anti-iridescent layer. As discussed and described further below, certain preferred embodiments of the invention involve performing the aforesaid deposition by means of pyrolytic deposition techniques.

The present invention is a significant advance in the art of coated glazing articles for a number of reasons. Most notably, it provides in certain preferred embodiments a product and a method of producing such product which are tolerant of naturally occurring variations in film thicknesses both in the optically functional layer and in the anti-iridescence layer, film thickness uniformity, refractive index values, and the like. The substantially transparent glazing articles of preferred embodiments of the invention have little or no visible iridescence, yet provide desired optical properties such as, for example, low emissivity, visible transparency, infrared reflectivity, ultra-violet reflectivity, and/or electrical conductivity. The anti-iridescence layer of the present invention is compatible with commercially significant coatings employed to provide such optical properties. In accordance with certain preferred embodiments, a single, uniform, muted perceptible color or a colorless appearance is provided. It should be noted in this regard, that it is a significant advantage of the present invention that the anti-iridescence undercoat of preferred embodiments is effective in providing a colorless appearance over a broad thickness range for many optically functional overcoats. It will also be appreciated by those skilled in this industrial area that the invention can provide these features and advantages, in preferred embodiments, employing well-known and readily commercially available production equipment and materials. In addition, while not wishing to be bound by theory, the performance of such preferred embodiments is understood to be improved by sodium suppression provided by the anti-iridescence layer. Moreover, some or all of the above advantages can be achieved in accordance with certain preferred embodiments of the invention through the use of a continuous process which is fully compatible with manufacturing processes presently used in the coated glass industry. Presently available optics predictions programs, versions of which are commercially available and well-known to those skilled in the coated glass industry, can be readily employed to identify optimal thicknesses and refractive indexes for the various zones of the anti-iridescence layer of the invention.

It is a highly significant feature of the anti-iridescence layer of the glazing article of the present invention that a low refractive index zone is sandwiched between high refractive index zones. While not wishing to be bound by theory, significant advantages of the invention are believed to result at least partly from this key feature. Notably, its industrial robustness, that is, its tolerance of parameter variations, such as film thickness, refractive index etc., is believed due at least partly to this high-/low/high refractive index sandwiching feature.

Additional advantages and features of the invention will be better understood from the detailed description of certain preferred embodiments set forth below, taken in conjunction with the accompanying drawings.

Figure 1:
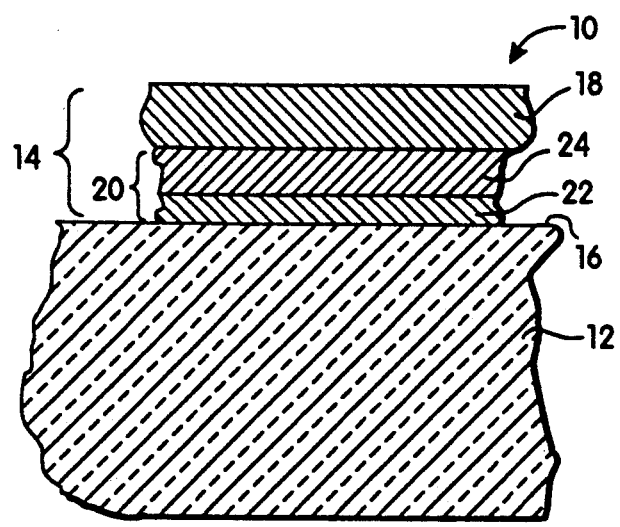
FIG. 1 is a cross-sectional view of a substantially transparent glazing article, partially broken away, in accordance with a preferred embodiment of the present invention, in which a substantially transparent coating is formed on a surface of a glass substrate.

It should be recognized that the drawings is not to scale and film thicknesses are greatly exaggerated with respect to the glass substrate for clarity of illustration and ease of understanding the drawing.

DETAILED DESCRIPTION OF PREFERRED EMBODIMENTS

It should be understood that occasional reference herein to the optically functional layer as a "top coat" or the like, is for ease of discussion and understanding, especially taken in conjunction with FIG. 1 wherein the optically functional layer is illustrated as a mono-film in a "top" position. It is not intended, however, to limit the optically functional layer to one exposed to the atmosphere or otherwise necessarily occupying a "top" position. Thus, for example, in certain embodiments of the invention additional layers, for example protective layers, may cover the optically functional layer. In other embodiments the coated surface may be laminated to a second ply of the glazing article.

Anti-iridescence undercoats of the present invention are applicable both to provide a colorless appearance for a coated substrate, and, in the alternative, to provide a single, substantially uniform, muted, perceptible color in the glazing article Based on the present disclosure, selection of refractive indices and film thicknesses to achieve one or the other of these results, along with determining other optical features and properties of the finished product can be readily determined empirically by those skilled in the art or, for example, by employing a commercially available optics prediction software program. Such programs, typically run on commercially available computer systems, are well known to greatly facilitate close approximation of an optimized final commercial product. Typically, a graphic presentation of the optical properties of a given glazing article, sorted by individual layer thickness and refractive index, can be used to determine the regions of optimum film stack design. In particular, such graphic representation can assist in readily identifying industrially robust film stack designs of the present invention. That is, designs in which performance is tolerant of variations in film thickness, refractive index and other parameters normal during industrial production of coated glazing articles.

Referring specifically to FIG. 1, a substantially transparent glazing article 10 is seen to comprise a glass substrate 12 having coating 14 carried on its upper surface 16. The glass substrate 12 preferably is soda-lime glass having a refractive index of about 1.5. The glazing article may, for example, be adapted for use in an architectural glazing application or the like. Those skilled in the art will recognize that substrates alternative to glass will be suitable, although certain methods of forming coating 14, such as pyrolytic deposition, may be unsuitable for certain alternative substrate materials, for example, certain plastic substrates. The coating 14 comprises an optically functional layer 18 having a higher refractive index than the substrate. Layer 18 is exposed to the atmosphere. According to the preferred embodiment of FIG. 1, the optical functionality of the coating includes low emissivity, infrared reflectivity and ultraviolet reflectivity. Preferably, optically functional layer 18 is about 2,000 to 10,000 Angstroms thick. More preferably, the optically functional layer is about 2,000 to 5,000 Angstroms thick, most preferably about 3,500 to 4,000 Angstroms thick, having an average refractive index (over the visible wavelength range) of about 1.7 to 2.5, more preferably about 1.9 to 2.1, most preferably about 1.9 (measured at 550 nm wavelength). Such preferred materials for the optically functional layer 18 include, for example, tin oxide, fluorine doped tin oxide and other metal oxides of suitable refractive index. According to a most preferred embodiment, layer 18 consists essentially of fluorine doped $SnO_2$ having a refractive index (average) of 1.9. In such embodiment layer 18 is substantially transparent, that is, it is substantially transparent (within the context of its intended use) to visible light. It also provides infrared reflectivity and ultraviolet reflectivity for solar load control. In addition, it has good electrical conductivity and could be used, therefore, for applications including electrical resistance heating, etc. The high/low/high refractive index sandwiching feature of the invention is especially effective in use under an optically functional layer consisting of a fluorinated tin oxide in certain distinct thickness ranges 2500–3000 Angstroms, 3500–4000 Angstroms and 4800–5200 Angstroms. Tolerance to thickness variations is especially good for fluorinated tin oxide in the first two ranges. Approximately the same preferred thickness ranges apply to unfluorinated tin oxide. In general, the terms "tin oxide" and "$SnO_2$," as used hereinafter, mean both fluorinated and unfluorinated tin oxide, unless otherwise specified. Such preferred embodiments of the invention are particularly advantageous for use in insulated glazing units and like applications. Insulated glazing units include those with multiple panes having an air gap between adjacent panes. In a two pane glazing unit, taking the outside surface of the outer pane as the No. 1 surface, its inside surface (i.e., the surface facing the air gap) as the No. 2 surface, the outside surface of the inner pane (again, facing the air gap) as surface No. 3, and the inside surface of the inner pane as the No. 4 surface, a coating of the invention according to such preferred embodiments would preferably be on the No. 3 surface in a colder climate (such as Northern U.S.) and on the No. 2 surface in a warmer climate (such as Southern U.S.). In a triple glazed unit, the coating preferably is on the No. 2 surface in a warmer climate and on the No. 5 surface (the air gap side of the innermost pane) in a colder climate.

According to another highly preferred embodiment of the invention, glazing article 10 is adapted for architectural glazing purposes and the coating 14 is a low emissivity coating in which layer 18 consists essentially of fluorinated tin oxide, having a thickness between about 3,500 and 4,000 Angstroms. In conjunction with the preferred anti-iridescence layer described below, the resulting glazing article is substantially colorless in both reflected and transmitted light. That is, the visible iridescence which would otherwise be shown by such glazing article is eliminated without substantially impairing the optical properties of the coating. Specifically, the low emissivity property of the tin oxide or fluorine-doped tin oxide layer is not significantly reduced or impeded by the anti-iridescence layer. It is a significant advantage of preferred embodiments of the invention that anti-iridescence is achieved with such thin optically functional films. As noted above, certain prior art teaching has recommended the use of thicker films to avoid iridescence, although this involves several disadvantages, including a greater tendency toward thermal stress cracking, longer (and, hence, more costly) deposition periods, greater loss of transparency, etc.

It will be recognized by those skilled in the art in view of the present disclosure that numerous alternative optically functional layers can be employed in lieu of, or together with, the tin oxide layer 18 of the above discussed preferred embodiments of the invention. Particularly advantageous alternative materials include, for example, zinc oxide, titanium oxide, antimony doped tin oxide, indium tin oxide and tungsten oxide. The optically functional layer 18 also may be a composite of multiple films and may not be exposed to the atmosphere, as noted above. Thus, for example, the aforesaid low emissivity film may be provided with an overcoating of protective material, such as silicon dioxide, etc. Those skilled in the art will recognize innumerable additional and alternative films which may be used together with the main film of the optically functional layer 18 including adjunct films such as, for example, abrasion resistant films, color imparting films, and the like. With respect to coating 14 not being exposed to the atmosphere, it may be positioned at an interface between laminated plies of a glazing article. Alternatively, it may be employed on an inside surface of a transparent substrate used in a double glazing article, such that the coating is exposed to a vacuum or air gap between two spaced plies.

Coating 14 further comprises anti-iridescence layer 20 which substantially eliminates the visible iridescence which would otherwise show, particularly in viewing sunlight reflected from the coated surface. The anti-iridescence layer 20 eliminates visible iridescence while not significantly impairing the optically functional film's desirable properties discussed above, including most notably its infrared reflectivity, ultraviolet reflectivity and low emissivity. Layer 20 is less thick than the optically functional layer 18, preferably being about 400 to 1200 Angstroms thick, more preferably about 700 to 1,000 Angstroms thick. In the preferred embodiment of FIG. 1, it consists essentially of a low refractive index zone sandwiched between two high refractive index zones. High refractive index zone 22 is deposited directly on surface 16 of glass substrate 12. It should be understood that description of a layer or zone as being deposited "directly" on or over another surface or another layer is intended to mean that it forms an interface with such layer or surface without any other layer of zone intervening between them. In the preferred embodiment illustrated, anti-iridescence layer 20 is positioned directly on surface 16 and directly under layer 18. As used herein, this is intended to mean there is no thin film coating or the like mediate the anti-iridescence layer 20 and the substrate 12. Thus, surface 16 is a surface of the bulk material of substrate 12, rather than of some other coating material deposited onto substrate 12 prior to deposition of coating 14. Similarly, anti-iridescence layer 20 is positioned directly under optically functional layer 18 in the sense that there is no mediate film or coating between them. High refractive index zone 22 preferably is about 100 to 500 Angstroms thick, more preferably 100 to 300 Angstroms thick. It is a significant feature of the embodiment of FIG. 1, in accordance with general principles of the invention discussed above, that first zone 22 has a refractive index higher than that of the substrate 12. For a substrate of soda-lime glass or other material having a refractive index about 1.5, the refractive index of zone 22 is higher than that of glass substrate 12. The refractive index of zone 22 preferably is between about 1.6 and 2.5, more preferably being about 1.9. Suitable materials for high refractive index zone 22 are readily commercially available and will be apparent to those skilled in the art in view of the present disclosure. Tin oxide, having a refractive index of 1.9, is most preferred for zone 22 in the above mentioned low emissivity embodiment of the invention employing a glass substrate 12 and a tin oxide (optionally fluorinated) optically functional layer 18. Suitable materials for high refractive index zone 22 are listed in Table A below.

TABLE A

Coating Materials with High Refractive Index

| Material | Formula | Refractive Index |
|---|---|---|
| tin oxide | $SnO_2$ | 1.9 |
| silicon nitride | $Si_3N_4$ | 2.0 |
| silicon monoxide | SiO | about 2.0 |
| zinc oxide | ZnO | 2.0 |
| indium oxide | $In_2O_3$ | 2.0 |
| vanadium oxide | $V_2O_5$ | about 2.0 |
| tungsten oxide | $WO_3$ | about 2.0 |
| niobium oxide | $Nb_2O_5$ | 2.1 |
| tantalum oxide | $Ta_2O_5$ | 2.1 |
| zirconium oxide | $ZrO_2$ | 2.1 |
| cerium oxide | $CeO_2$ | 2.2 |
| zinc sulfide | ZnS | 2.3 |
| titanium oxide | $TiO_2$ | 2.5 |

Anti-iridescence layer 20 in the embodiment illustrated in FIG. 1 further comprises a low refractive index zone directly on high refractive index zone 22 and a second high refractive index zone directly on the low refractive index zone. Together, the low refractive index zone and the second high refractive index zone form a gradient index zone 24 deposited directly over high refractive index zone 22. The gradient index zone 24 is directly under the optically functional layer 18. Preferably it is about 300 to 800 Angstroms thick. The refractive index of zone 24 increases substantially continuously with distance from the substrate surface. Specifically, the refractive index increases from a lower value at the interface with high refractive index zone 22 to a higher value at the interface with optically functional layer 18. The lower value of the refractive index at the interface with zone 22 is substantially lower than that of zone 22. The higher refractive index at the interface with layer 18 need only be substantially higher than the lower refractive index. It need not be higher than, or as high as, the refractive index of either zone 22 or layer 18. In the preferred embodiment of the invention referred to above, wherein the substrate is glass having a refractive index of about 1.5 and the high refractive index zone 22 is tin oxide having a refractive index of about 1.9, the refractive index of the gradient refractive index zone 24 preferably increases from a lower value between about 1.4 and 1.5, most preferably about 1.44, to a higher value between about 1.8 and 2.5, most preferably about 1.9. According to one such embodiment, gradient refractive index zone 24 consists of co-deposited tin oxide and silicon dioxide. The relative proportion of the two materials changes substantially constantly with distance from the substrate. Specifically, at the interface with high refractive index zone 22 the gradient refractive index zone 24 is between about 90 and 100% silicon dioxide, most preferably about 100% silicon dioxide. The silicon dioxide percentage decreases substantially continuously with distance from the substrate to a value between about zero and ten percent, most preferably about zero percent at the interface with the optically functional layer 18. Throughout the gradient refractive index zone 24 the balance of the composition is tin oxide in this preferred embodiment.

Alternative suitable materials, primarily for codeposition with materials listed above in Table A, are listed in Table B.

TABLE B

Coating Materials with Low Refractive Index

| Material | Formula | Refractive Index |
|---|---|---|
| aluminum oxide | $Al_2O_3$ | 1.65 |
| silicone polymer | $[(CH_3)_2SiO]_n$ | 1.4 |
| magnesium fluoride | $MgF_2$ | 1.38 |
| cryolite | $Na_3AlF_6$ | 1.33 |

Several processes for forming the coatings of the present invention are readily commercially available and are well known to those skilled in the art. Preferred processes for depositing the anti-iridescence layer 20 and the optically functional layer 18, include, for example, sputtering, sol-gel, plasma enhanced CVD and pyrolytic deposition, including spray pyrolysis and chemical vapor deposition. It should be recognized that the refractive index of the materials employed in the layers of the coating of the present invention may vary slightly depending on the method used in their deposition.

A glazing article in accordance with the invention, having good anti-iridescence properties, is illustrated in the following example.

EXAMPLE

Soda-lime float glass is heated to about 600° C. in a laboratory belt furnace. A gaseous mixture consisting of 7.0% difluoroethane, 0.4% water, 0.6% tin tetrachloride and the balance nitrogen is passed over the heated glass resulting in deposition of a fluorine doped tin oxide film approximately 200 Angstroms thick. The tin tetrachloride and water vapor are kept separate until just prior to reaction. A second film is then coated over the first film by directing over the glass a spray mixture of water, air, tin tetrachloride and silicon tetrachloride. The ratio of silicon to tin tetrachloride in the spray mixture gradually decreases, thereby forming a film in which the refractive index starts at a value essentially equal to that of silicon oxide (1.44) and increase to that of tin oxide (1.9). The thickness of this transition layer is approximately 500 Angstroms. A third layer is then formed on the glass by passing a gaseous mixture over the glass which has the same composition as the gaseous mixture used for the first tin oxide film. This third film is a fluorine doped tin oxide film about 3,500 Angstroms thick. The resulting product has a color purity of about 5% and an infrared emissivity of about 0.2.

It will be understood by those skilled in the art in view of the present disclosure that the foregoing discussion of certain preferred embodiments is intended for purposes of illustration, rather than limitation. Various modifications will be readily apparent in view of the present disclosure and the following claims are intended to cover the full scope of the invention, including such modifications.

I claim:

1. A substantially transparent glazing article comprising a substantially transparent substrate having a substantially transparent coating on a surface thereof, said coating comprising an optically functional layer having a refractive index higher than that of the substrate, and an anti-iridescence layer positioned mediate the substrate surface and the optically functional layer, the anti-iridescence layer being less thick than the optically functional layer and having:
   a first high refractive index zone directly on the substrate surface and forming a first interface therewith, having a refractive index which at least at said first interface is higher than that of the substrate;
   a first low refractive index zone directly on the first high refractive index zone and forming a second interface therewith, having a refractive index which at least at said second interface is lower than the refractive index of the first high refractive index zone at said second interface; and
   a second high refractive index zone directly on the first low refractive index zone and forming a third interface therewith, having a refractive index which at least at said third interface is higher than the refractive index of the first low refractive index zone at said third interface; the refractive index of the anti-iridescence layer varying in at least one of said zones substantially continuously with distance from said substrate surface.

2. The substantially transparent glazing article according to claim 1 wherein the refractive index of the first high refractive index zone and the refractive index of the second high refractive index zone each is substantially constant with distance from the substrate surface, the refractive index of the low refractive index zone increasing substantially continuously with distance from the substrate surface.

3. The substantially transparent glazing article according to claim 1 wherein said first low refractive index zone and said second high refractive index zone together form a gradient index zone wherein the refractive index varies substantially continuously with distance from said substrate surface.

4. The substantially transparent glazing article of claim 3 wherein the refractive index of the gradient index zone increases substantially continuously with distance from the substrate surface from a value at said first interface which is lower than the refractive index of the substrate to a value at an interface with the optically functional layer which is lower than the refractive index of the optically functional layer.

5. The substantially transparent glazing article according to claim 4 wherein the substrate is glass and has a refractive index of about 1.5, said optically functional layer is about 2,000 to 10,000 Angstroms thick and has a refractive index of about 1.9, the first high refractive index zone is about 100 to 300 Angstroms thick and has a refractive index of about 1.9, and the gradient index zone is about 300 to 800 Angstroms thick and has a refractive index which increases substantially continuously from about 1.44 at its interface with the first high refractive index zone to about 1.75 at its interface with the optically functional layer.

6. The substantially transparent glazing article according to claim 5 wherein said gradient index zone is about 300 to 800 Angstroms thick and consists essentially of $SiO_2$ and $SnO_2$, the relative proportion of $SnO_2$ in said gradient index zone increasing substantially continuously with distance from said substrate.

7. The substantially transparent glazing article according to claim 6 wherein the first high refractive index zone consists essentially of about 100 to 300 Angstroms of tin oxide.

8. The substantially transparent glazing article according to claim 7 wherein the optically functional layer consists essentially of tin oxide having a thickness selected from the ranges approximately 2,500 to 3,000, 3,500 to 4,000 and 4,800 to 5,200 Angstroms.

9. The substantially transparent glazing article according to claim 1 wherein said anti-iridescence layer further comprises additional zones of alternating low and high refractive index mediate the second high refractive index zone and the optically functional layer.

10. The substantially transparent glazing article of claim 1 wherein the refractive index of at least a portion of the low refractive index zone does not exceed the refractive index of the optically functional layer and does not exceed the refractive index of the substrate.

11. The substantially transparent glazing article of claim 1 wherein the refractive index of the second high refractive index zone does not exceed the refractive index of the optically functional layer.

12. A substantially transparent glazing article comprising a substantially transparent glass substrate having a substantially transparent coating on a surface thereof, said coating comprising an optically functional layer about 2,000 to 10,000 Angstroms thick and having a refractive index between about 1.7 and 2.5, and an anti-iridescence layer less thick than the optically functional layer positioned mediate the substrate surface and the optically functional layer, the anti-iridescence layer comprising
- a high refractive index zone about 100 to 500 Angstroms thick, having a refractive index between about 1.6 and 2.5, directly on the substrate surface, and
- a gradient index zone about 300 to 800 Angstroms thick directly on the high refractive index zone and directly under the optically functional layer, having a refractive index which increases substantially continuously with distance from the substrate surface from a lower value between about 1.4 and 1.5 to an upper value between about 1.8 and 2.5.

13. A substantially transparent glazing article comprising a substantially transparent glass substrate having a refractive index of about 1.5 and having a substantially transparent coating on a surface thereof, said coating consisting essentially of (i) a layer of tin oxide about 2,000 to 4,000 Angstroms thick having a refractive index of about 1.9, and (ii) an anti-iridescence layer which is about 400 to 1200 Angstroms thick and consists essentially of a 100 to 300 Angstroms thick zone of tin oxide having a refractive index of about 1.9 directly on said substrate surface and a 300 to 800 Angstroms thick gradient index zone wherein the refractive index increases substantially continuously with distance from said substrate surface from about 1.44 at a first interface with said zone of tin oxide to less than about 1.9 at a second interface with said layer of tin oxide, said gradient index zone consisting essentially of a mixture of tin oxide and silicon oxide wherein the relative proportion of the tin oxide in said mixture increases from approximately zero percent at said first interface to more than 60% at said second interface.

14. A method of making a substantially transparent glazing article comprising deposition of a substantially transparent coating on a surface of a substantially transparent substrate, the coating comprising an optically functional layer and an anti-iridescence layer between the substrate surface and the optically functional layer, said deposition comprising the steps of:
- first depositing the anti-iridescence layer by depositing a first high refractive index zone directly on the substrate surface, the first high refractive index zone having a refractive index which at least at said substrate surface is higher than that of the substrate, then depositing a first low refractive index zone directly on the first high refractive index zone, the first low refractive index zone having a refractive index which at least at its interface with the first high refractive index zone is lower than that of the first high refractive index zone at that interface and a second high refractive index zone directly over the first low refractive index zone, having a refractive index which at least at its interface with the first low refractive index zone is higher than that of the first low refractive index zone at that interface; and
- then depositing the optically functional layer directly on the anti-iridescence layer, the optically functional layer being 2,000 to 10,000 Angstroms thick and having a refractive index greater than the refractive index of the substrate.

15. The method of claim 14 wherein each said deposition is by pyrolytic deposition.

* * * * *